Feb. 15, 1938.　　E. E. BENEDICT　　2,108,575
BATHROOM SCALE
Filed March 29, 1935　　2 Sheets-Sheet 1
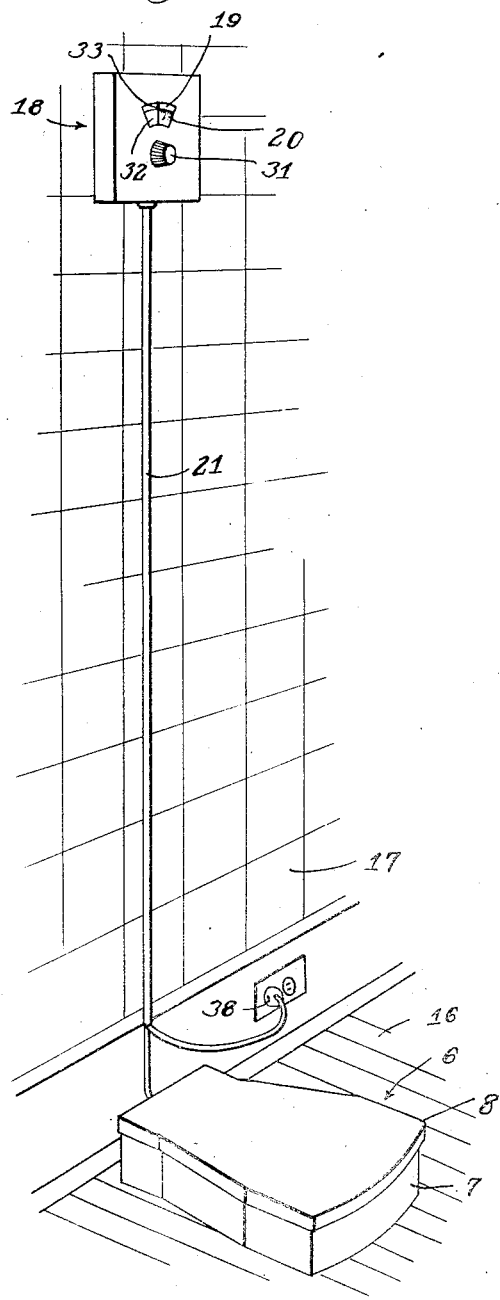
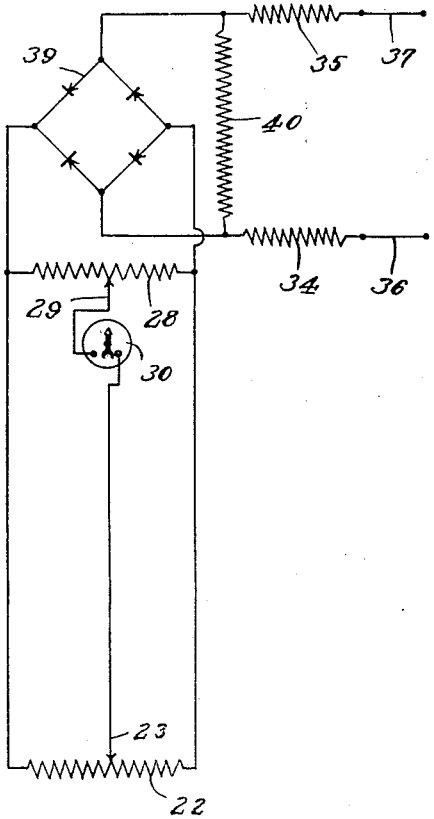
Inventor:
Erwin E. Benedict Feb. 15, 1938.  E. E. BENEDICT  2,108,575
BATHROOM SCALE
Filed March 29, 1935   2 Sheets-Sheet 2
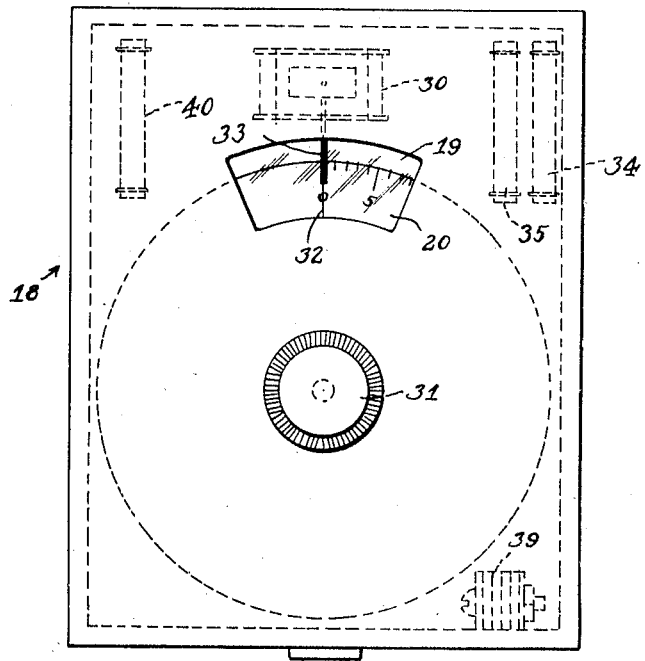
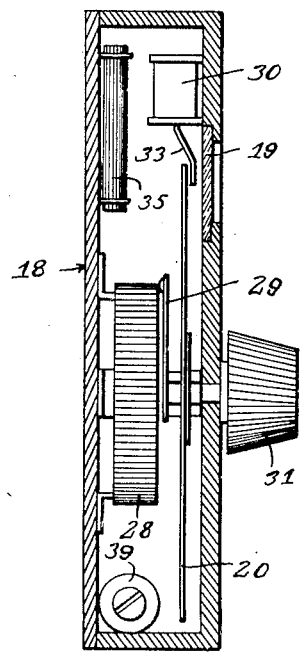
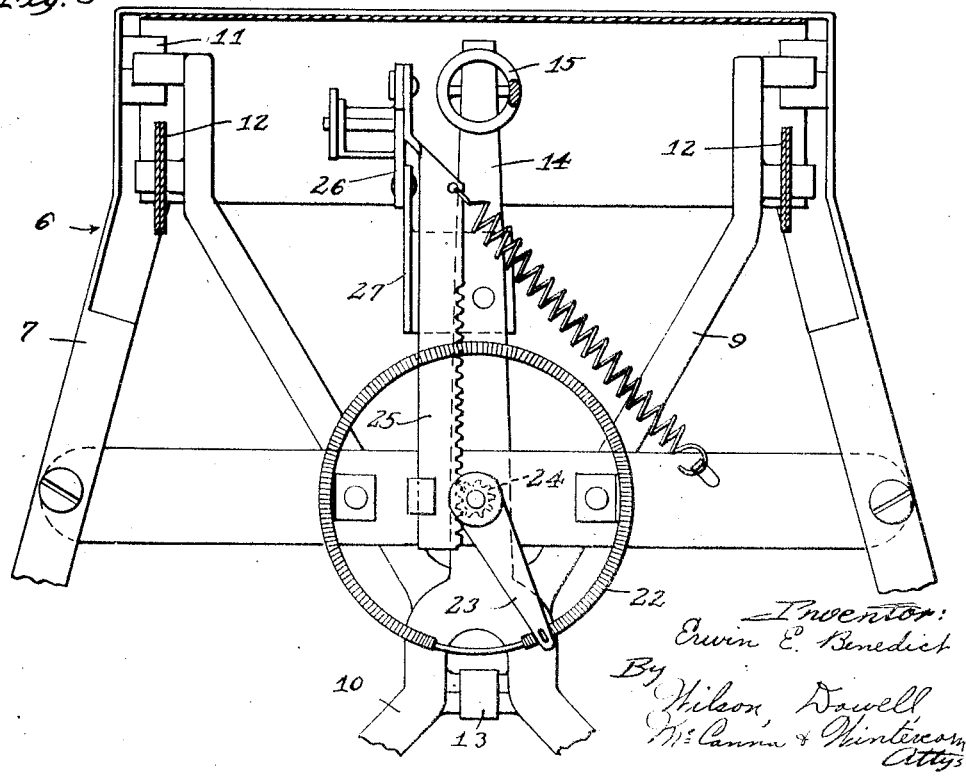
Inventor:
Erwin E. Benedict
By Wilson, Dowell,
McCann & Wintercorn
Attys.

Patented Feb. 15, 1938

2,108,575

UNITED STATES PATENT OFFICE 2,108,575

BATHROOM SCALE

Erwin E. Benedict, Rockford, Ill., assignor to The Brearley Company, Rockford, Ill., a corporation of Illinois Application March 29, 1935, Serial No. 13,729

3 Claims. (Cl. 177—351)

This invention relates to scales for weighing persons, and has particular reference to that type known as bathroom scales.

Bathroom scales have been constructed with the weight-indicating dial usually about as low as the platform, as an integral part of the scale, thus making it awkward to read. In the scale of my invention, it is proposed to have a separate indicator mounted on the wall and supported entirely independently of the scale and merely connected therewith by a flexible cord, the scale and indicator being electrically connected thereby. Thus, the indicator may be placed at any desired elevation, preferably at eye level, making it easy to read.

A salient feature of my invention consists in the use of a resistance Wheatstone bridge circuit which is thrown out of electrical balance on the one hand by the adjustment of a variable resistance in proportion to the weight of the person standing on the scale platform, and which is arranged to be re-balanced by the person adjusting a second variable resistance, the manual adjusting means having in connection therewith a weight-indicating dial so that the correct weight is indicated when the needle of a galvanometer included in the electrical circuit gives a zero indication. The person in weighing himself adjusts the second resistance by means of a knob, which is turned in the same way as a radio dial. In accordance with the invention, the galvanometer is so placed with respect to the hairline or index of the weight-indicating dial that the return of the needle to zero when the correct adjustment is made is seen as superimposed upon the dial reading, the dial and the galvanometer utilizing the same hairline as an index, thus making it very convenient to read the indicated weight.

The invention is illustrated in the accompanying drawings, in which—

Figure 1 is a perspective of a bathroom scale and its associated wall indicator made in accordance with my invention;

Fig. 2 is an electrical circuit diagram therefor;

Fig. 3 is a fragmentary view of the scale illustrating the rheostat that is operated under weight imposed upon the scale platform;

Fig. 4 is a larger face view of the wall indicator showing certain parts thereof in dotted lines, and Fig. 5 is a cross-section of the indicator showing the manually operable rheostat thereof.

The same reference numerals are applied to corresponding parts throughout the views.

Referring to Figs. 1 and 3, the scale 6 may be any domestic type platform scale and comprises a base 7 and platform 8. The latter is supported on wishbone levers 9 and 10 that are fulcrumed, as indicated at 11, on the base. Two of the four supporting legs for the platform 8 are indicated at 12, bearing upon the lever 9, the other two legs at the other end of the platform cooperating in a similar fashion with the lever 10. The levers 9 and 10 are linked together, as at 13, and the lever 10 has an extension 14 attached to the lower end of a coiled spring 15 suitably supported on the base 7. The spring resists the movement of the levers in the usual way to counterbalance the weight imposed upon the platform 8. The scale is shown resting on the floor 16 next to a wall 17 on which the weight-indicating device 18 is mounted. The latter is placed preferably at such an elevation that the window 19 thereon will be approximately at eye level so as to make it easy to read the weight indicated on the dial 20. The device 18 is supported entirely independently of the scale 6 and is connected with the scale only through a flexible conduit 21 through which the scale and indicator are electrically connected, as hereinafter described. One can, therefore, place the indicator at whatever level is desired to best suit the convenience of the operator, and, of course, the indicator may be placed on one wall with the scale placed so it faces another wall at right angles thereto, if the available space in the bathroom is such that it requires that arrangement.

The scale 6 is generally similar in construction to that disclosed in the copending application of John C. Sutton, Serial No. 13,395, filed March 28, 1935, but has in place of the usual weight-indicating dial in which either the dial or a pointer is turned in proportion to the weight imposed upon the platform, a rheostat 22 relative to which an arm 23 is arranged to be rotated to adjust the rheostat in proportion to the weight imposed upon the platform. The arm 23 is turned with a pinion 24 meshing with a rack 25 that is operated, as in the Sutton application just mentioned, by the oscillation of a bell-crank lever 26 suitably connected, as at 27, to the extension 14 of the lever 10. The rheostat 22 and its movable arm 23 constitute the electrical transmitter related to the receiver in the indicator 18, which is shown in Figs. 4 and 5. Both are shown in Fig. 2 as a part of a resistance Wheatstone bridge circuit. The receiver comprises a rheostat 28 and adjustable arm 29 operable by hand by the operator to balance the circuit, a galvanometer 30 being included in the circuit to indicate when the arm 29 has been properly adjusted. Now, the arm 29 is turned by means of a knob 31 on the indicator 18, and the dial 20, previously mentioned, is turned with it at the same time and serves to indicate by its final position with respect to the hairline or index mark 32 the weight of the person standing on the scale platform. In other words, the person standing on the scale determines his weight by properly adjusting the rheostat 28 by turning the knob 31 to the proper point similarly as one adjusts a radio dial. The galvanometer 30 may, of course, be separate and independent of the dial 20, it being important only that the operator turn the knob 31 far enough to secure zero deflection of the galvanometer needle; however, I prefer to have the needle 33 of the galvanometer 30 visible through the same window 19 as the dial 20, and movable relative to the same index 32, because it makes for easier and quicker operation, greater convenience in reading, and a simpler and cheaper construction. It will, of course, be evident that, instead of the dial 20, I may provide a pointer arranged to turn with respect to a fixed scale to indicate the weight in accordance with the adjustment of the rheostat 28. Figs. 4 and 5 serve to indicate clearly the relationship of the galvanometer needle 33 to the dial 20 and window 19, and in Fig. 5 it is also apparent how the arm 29 of the rheostat 28 is turned simultaneously with the dial 20 by the knob 31.

The electrical circuit diagram (Fig. 2) shows two fixed high resistances 34 and 35 connected in series with the line conductors 36—37. These serve to cut down the current flow to such low amperage that any danger of electrical shock is eliminated in the operation of this scale. Thus, one may with entire safety, connect the device to an ordinary light socket, as by means of an attachment plug 38 (Fig. 1). A rectifier 39 is shown connected across the line so as to enable use of the present scale with alternating or direct current. The shunt resistance 40 is to safeguard the delicate galvanometer 30 in the event of any line disturbance.

The scale of my invention will weigh accurately regardless of voltage fluctuation such as is bound to occur in the ordinary domestic lighting circuit due to fluctuating demand. The reason I secure accurate weighing is that there is no current flow whatever in the circuit when the knob 31 has been adjusted to balance the circuit. Thus if a fluctuation should occur while a person is weighing himself, and even at the moment that the circuit is balanced by accurate adjustment of the knob 31, it will not affect the operation at all.

I claim:

1. A device of the class described, for the weighing of a person in a room, comprising in combination, a domestic type platform scale adapted to rest on the floor of the room in proximity to a wall thereof, a wall type indicator adapted to be attached to the wall at the approximate eye level of a person on said scale, a transmitter including an impedance, means to vary said impedance dependent upon the weight of the person being weighed, electrical connections between said transmitter and said indicator, and means on said indicator and responsive to said variations of said impedance to indicate the weight of the person.

2. A device of the class described, for the weighing of a person in a room, comprising in combination, a domestic type platform scale adapted to rest on the floor of the room in proximity to a wall thereof, a wall type indicator adapted to be attached to the wall at the approximate eye level of a person on said scale, a transmitter including an impedance, means to vary said impedance dependent upon the weight of the person being weighed, flexible electrical connections between said transmitter and said indicator permitting up and down adjustment of the indicator on the wall independently of the scale and also permitting movement of the scale on the floor independently of the indicator, and means on said indicator and responsive to said variations of said impedance to indicate the weight of the person.

3. A device of the class described, for the weighing of a person in a room, comprising in combination, a domestic type platform scale adapted to rest on the floor of the room in proximity to a wall thereof, a receiver comprising a manually variable impedance and a wall type indicator adapted to be attached to the wall at the approximate eye level of a person on said scale, a transmitter including an impedance, means to vary said impedance dependent upon the weight of the person being weighed, an electrical network between said transmitter and receiver whereby said manually adjustable impedance may be varied to correspond to the variation of the transmitter impedance, and means operated by the last named means on said indicator to indicate the weight of the person.

ERWIN E. BENEDICT.